(12) United States Patent
Zhou et al.

(10) Patent No.: US 9,843,639 B2
(45) Date of Patent: Dec. 12, 2017

(54) METHOD FOR INTER-DEVICE COMMUNICATION PROCESSING AND ELECTRONIC DEVICE

(75) Inventors: Xiaoyu Zhou, Beijing (CN); Xiaobing Guo, Beijing (CN)

(73) Assignees: LENOVO (BEIJING) CO., LTD., Haidian District, Beijing (CN); BEIJING LENOVO SOFTWARE LTD., Haidian District, Beijing (CN)

( * ) Notice: Subject to any disclaimer, the term of this patent is extended or adjusted under 35 U.S.C. 154(b) by 274 days.

(21) Appl. No.: 14/235,165

(22) PCT Filed: Jul. 23, 2012

(86) PCT No.: PCT/CN2012/079054
§ 371 (c)(1),
(2), (4) Date: Jan. 27, 2014

(87) PCT Pub. No.: WO2013/013608
PCT Pub. Date: Jan. 31, 2013

(65) Prior Publication Data
US 2014/0156797 A1 Jun. 5, 2014

(30) Foreign Application Priority Data
Jul. 26, 2011 (CN) .......................... 2011 1 0210867

(51) Int. Cl.
*G06F 15/16* (2006.01)
*H04L 29/08* (2006.01)
*H04M 1/725* (2006.01)

(52) U.S. Cl.
CPC ........ *H04L 67/141* (2013.01); *H04M 1/7253* (2013.01)

(58) Field of Classification Search
USPC .......... 709/217, 219; 382/293, 278; 177/245
See application file for complete search history.

(56) References Cited

U.S. PATENT DOCUMENTS

2003/0169413 A1* 9/2003 Stanek .................... G06E 3/005
356/2
2003/0169943 A1* 9/2003 Stanek .................... G01S 7/295
382/278

(Continued)

FOREIGN PATENT DOCUMENTS

CN 101401057 4/2009
CN 101415095 A 4/2009

(Continued)

OTHER PUBLICATIONS

PCT/CN2012/079054 International Preliminary Report on Patentability (9 pages including English translation) dated Jan. 28, 2014.

(Continued)

*Primary Examiner* — Tammy Nguyen
(74) *Attorney, Agent, or Firm* — Brinks Gilson & Lione; G. Peter Nichols

(57) ABSTRACT

A method and apparatus for inter-device communication processing is described. The method includes acquiring first sensing data collected by a first sensor arranged at a first electronic device and second sensing data collected by a second sensor arranged at a second electronic device; determining a first track on the basis of the first sensing data; determining a second track on the basis of the second sensing data; judging the first track and the second track match, and acquiring a first judgment result; when the first judgment result indicates that the first track and the second track match, executing a command related to data transmission to establish between the first electronic device and the second electronic device a transmission channel used for data transmission and/or perform data transmission between the first electronic device and the second electronic device.

12 Claims, 2 Drawing Sheets

(56) References Cited

U.S. PATENT DOCUMENTS

| | | | | |
|---|---|---|---|---|
| 2003/0169945 | A1* | 9/2003 | Stanek | G01S 3/7865 |
| | | | | 382/293 |
| 2006/0230038 | A1* | 10/2006 | Silverman | G06F 17/30017 |
| 2007/0213045 | A1 | 9/2007 | Hermansson et al. | |
| 2015/0096813 | A1* | 4/2015 | Aumente | B64F 1/366 |
| | | | | 177/245 |

FOREIGN PATENT DOCUMENTS

| | | |
|---|---|---|
| CN | 101641672 A | 2/2010 |
| CN | 201813440 U | 4/2011 |
| EP | 2189889 | 5/2010 |

OTHER PUBLICATIONS

PCT/CN2012/079054 International Search Report dated Nov. 15, 2012 (4 pages including English translation).

First Office Action dated Mar. 24, 2014 from corresponding Chinese Application No. 201110210867.6 (16 pages including English translation).

Second Office Action dated Nov. 2, 2014 from corresponding Chinese Application No. 201110210867.6 (17 pages including English translation).

\* cited by examiner

METHOD FOR INTER-DEVICE COMMUNICATION PROCESSING AND ELECTRONIC DEVICE

This application claims priority to International Application No. PCT/CN2012/079054 filed Jul. 23, 2012; and Chinese Patent Appln. 201110210867.6 filed Jul. 26, 2011, the entire contents of each are incorporated herein by reference.

BACKGROUND

The present disclosure relates to the field of electronics, and in particular, to a method and an apparatus for inter-device communication processing.

With the emergence of more and more consumer electronic devices, a user simultaneously owns a plurality of electronic devices such as a mobile phone, a PDA, a tablet computer, a desktop computer among the others has become increasingly ubiquitous.

What comes along is that, since the user has a plurality of electronic devices, data exchange between electronic devices is increasingly pervasive.

At present, exchanging data between electronic devices basically is by means of establishing a connection between the two, and then selecting an object that waits to be transmitted by the user, and then transmitting the object that waits to be transmitted to a peer terminal with the established connection.

In the process of implementing embodiments of the present disclosure, the inventor has found that, the method for inter-device communication processing in the prior art has at least the following disadvantages:

In the method for inter-device communication processing in the prior art, since the user is required to manually configure the network and also select the object to be transmitted, there is a drawback of inconveniencing the using.

SUMMARY

The object of embodiments of the present disclosure is to provide a method and an apparatus for inter-device communication processing, so as to provide the user with a simple way of inter-device communication.

In order to achieve the above object, embodiments of the present disclosure provide a method for inter-device communication processing, comprising:
  acquiring first sensing data collected by a first sensor arranged at a first electronic device and second sensing data collected by a second sensor arranged at a second electronic device;
  determining a first track on the basis of the first sensing data;
  determining a second track on the basis of the second sensing data;
  judging if the first track and the second track match, and obtaining a first judgment result; and
  when the first judgment result indicates that the first track and the second track match, executing a command related to data transmission to establish between the first electronic device and the second electronic device a transmission channel used for data transmission and/or perform data transmission between the first electronic device and the second electronic device.

In the method for inter-device communication processing described above, wherein when a transmission channel has already been established between the first electronic device and the second electronic device, executing a command related to data transmission specifically includes:
  executing a first sub-command, so as to transmit an object that waits to be transmitted to the second electronic device from the first electronic device.

In the method for inter-device communication processing described above, wherein when no transmission channel is established between the first electronic device and the second electronic device, executing a command related to data transmission specifically includes:
  executing a second sub-command, so as to establish a transmission channel between the first electronic device and the second electronic device; and
  executing a third sub-command, so as to transmit an object that waits to be transmitted to the second electronic device from the first electronic device.

In the method for inter-device communication processing described above, when the first judgment result indicates that the first track and the second track match, before executing a command related to data transmission, the method further comprises:
  determining an object that waits to be transmitted from objects stored in the first electronic device according to the first track.

The method for inter-device communication processing described above further comprises:
  acquiring an electronic device matching parameter;
  determining whether the first electronic device and the second electronic device match according to the electronic device matching parameter, and obtaining a second judgment result;
  wherein executing a command related to data transmission is implemented only when the first judgment result indicates that the first track and the second track match, and the first electronic device and the second electronic device match.

In the method for inter-device communication processing described above, wherein the first sensor is a touch sensor or a motion sensor, and the second sensor is a touch sensor or a motion sensor.

In order to achieve the above object, embodiments of the present disclosure provide an electronic device, comprising:
  a first sensor;
  a sensing data acquisition module for acquiring first sensing data collected by the first sensor and second sensing data collected by a second sensor arranged at a second electronic device;
  a first track determination module for determining a first track on the basis of the first sensing data;
  a second track determination module for determining a second track on the basis of the second sensing data;
  a first judgment module for judging if the first track and the second track match, and obtaining a first judgment result; and
  a command execution module for, when the first judgment result indicates that the first track and the second track match, executing a command related to data transmission to establish between the electronic device and the second electronic device a transmission channel.

In the electronic device described above, wherein when a transmission channel has already been established between the first electronic device and the second electronic device, the command execution module specifically includes:

a first execution unit for executing a first sub-command, so as to transmit an object that waits to be transmitted to the second electronic device from the first electronic device.

In the electronic device described above, wherein when no transmission channel is established between the first electronic device and the second electronic device, the command execution module specifically includes:

a second execution unit for executing a second sub-command, so as to establish a transmission channel between the first electronic device and the second electronic device; and a third execution unit for executing a third sub-command, so as to transmit an object that waits to be transmitted to the second electronic device from the electronic device.

The electronic device described above further comprises:
an object determination unit for determining an object that waits to be transmitted from objects stored in the electronic device according to the first track.

The electronic device described above further comprises:
a matching parameter acquisition module for acquiring an electronic device matching parameter; and
a second judgment module for determining whether the electronic device and the second electronic device match according to the electronic device matching parameter, and obtaining a second judgment result,
wherein the command execution module executes a command related to data transmission only when the first judgment result indicates that the first track and the second track match, and the second judgment result indicates that the first electronic device and the second electronic device match.

In the electronic device described above, wherein the first sensor is a touch sensor or a motion sensor, and the second sensor is a touch sensor or a motion sensor.

The embodiments of the present disclosure have the following beneficial effects:

In the embodiments of the present disclosure, when data transmission is required, the user only needs to operate electronic devices, so as to make sensors of the two electronic devices be capable of obtaining matched tracks according to the sensing data generated by the operation of the user, a subsequent transmission channel establishment and/or data transmission can be completed automatically, which reduces complexity of the user operation, and provides the user with a simple way to achieve communications between devices.

In the method and apparatus for inter-device communication processing in the embodiments of the present disclosure, sensing data is collected by sensors arranged at the electronic devices, and thereby tracks are determined according to the sensing data, a command related to data transmission can be executed when tracks of two electronic devices match, so as to establish between the first electronic device and the second electronic device a transmission channel used for data transmission and/or perform data transmission between the first electronic device and the second electronic device, thus providing the user with a simple way of inter-device communications.

Figure 1:
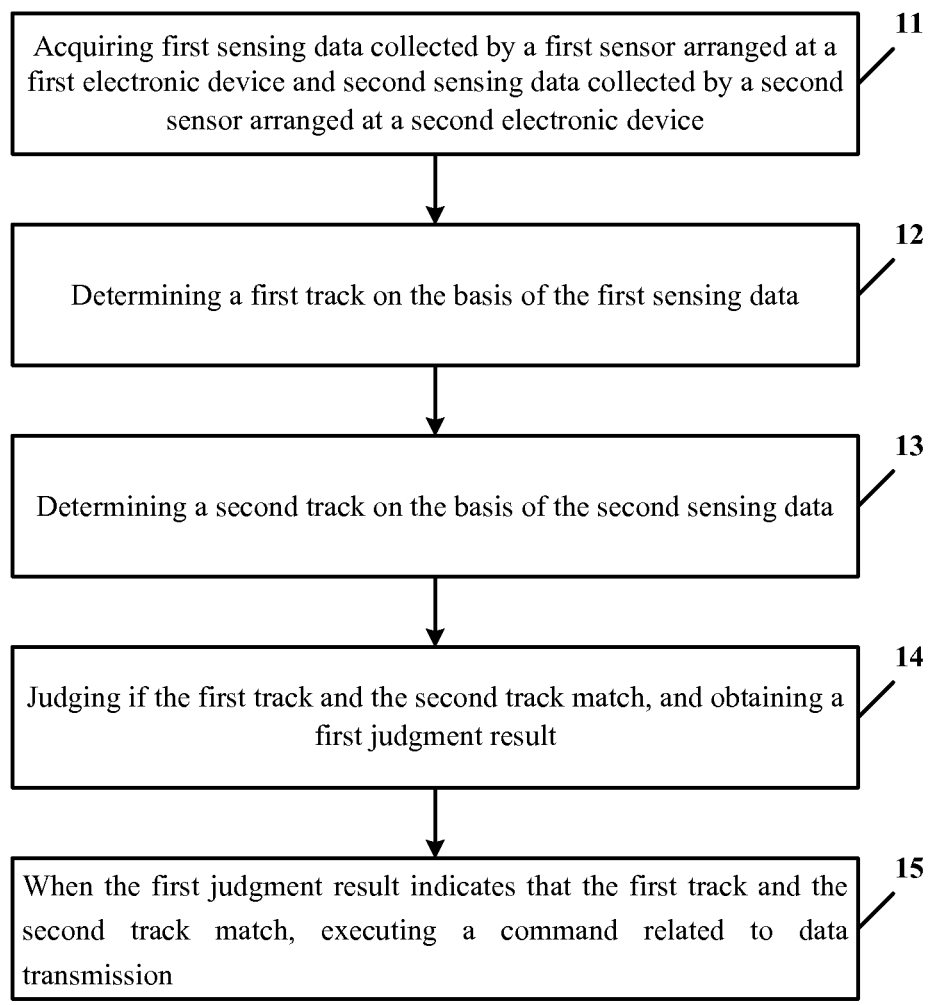
FIG. 1 shows a flowchart schematic diagram of the method for inter-device communication processing according to the embodiments of the present disclosure.

As shown in FIG. 1, the method for inter-device communication processing in the embodiments of the present disclosure comprises:

Step 11, acquiring first sensing data collected by a first sensor arranged at a first electronic device and second sensing data collected by a second sensor arranged at a second electronic device;

Step 12, determining a first track on the basis of the first sensing data;

Step 13, determining a second track on the basis of the second sensing data;

Step 14, judging if the first track and the second track match, and obtaining a first judgment result; and Step 15, when the first judgment result indicates that the first track and the second track match, executing a command related to data transmission to establish between the first electronic device and the second electronic device a transmission channel used for data transmission and/or perform data transmission between the first electronic device and the second electronic device.

In the specific embodiments of the present disclosure, two tracks are determined through the acquired sensing data collected by the sensors arranged at the electronic devices, and thereby a command related to data transmission is executed automatically according to whether the tracks match.

In the specific embodiments of the present disclosure, whether two tracks match needs to be detected so as to determine the execution of a subsequent command, it should be understood that, the matching herein may be processed by using any algorithms that detect track similarity, and whether there is a matching can be determined by setting a similarity threshold according to practical needs, if the similarity threshold is exceeded, then it can be considered there is a matching, the specific embodiments of the present disclosure makes no improvement to the track matching algorithms, thus no detailed descriptions are provided for how to judge whether the two match.

From the above description it can be found that, when data transmission is required, the user only needs to operate electronic devices, so as to make sensors of the two electronic devices be capable of obtaining matched tracks according to the sensing data generated by the operation of the user, a subsequent transmission channel establishment and/or data transmission can be completed automatically, which reduces complexity of the user operation, and provides the user with a simple way to achieve communications between devices.

In the specific embodiments of the present disclosure, it is necessary to determine two tracks on basis of sensing data respectively collected by the sensors of two electronic devices, and thereby a subsequent operation is determined by judging whether the two tracks match. In the specific embodiments of the present disclosure, the sensors may be a touch sensor on a touch screen, and may also be a motion sensor, which will be illustrated respectively as follows.

The first sensor and the second sensor both are a touch sensor.

Assuming that the first electronic device and the second electronic device both are a mobile phone with a touch screen, in this case, the user uses the middle finger and index finger of the same hand, the middle finger contacts the touch screen of the first electronic device, while the index finger contacts the touch screen of the second electronic device, then the user's wrist moves, the middle finger and index finger are driven to move with the same track on the two touch screens, respectively, at this time the tracks determined on basis of sensing data collected respectively by the sensors of the two electronic devices are substantially the same, then it can be judged that the two tracks match.

The first sensor is a motion sensor, and the second sensor is a touch sensor.

Assuming that the first electronic device is a mobile phone with a motion sensor, the second electronic device is a mobile phone with a touch screen, in this case, the user holds the first electronic device, then the user's middle finger contacts the touch screen of the second electronic device, thereafter the user's hand moves, the middle finger is driven to move in manner of drawing a circle on the touch screen of the second electronic device, while at the same time, the first electronic device is driven by the hand to move in manner of drawing a circle in the air, then the track determined on basis of the sensing data collected by the motion sensor and the track determined on basis of the sensing data collected by the touch sensor both are a circle, and the two tracks are substantially the same, then it can be determined that the two tracks match.

The first sensor is a motion sensor, and a second sensor is a touch sensor.

Assuming that the first electronic device is a mobile phone with a motion sensor, the second electronic device is a mobile phone with a touch screen, in this case, the user holds the first electronic device, then the user connects one corner of the first electronic device with the touch screen of the second electronic device, then the user's hand moves, the one corner of the first electronic device is driven to move in manner of drawing a circle on the touch screen of the second electronic device, at this time, the track determined on basis of the sensing data collected by the motion sensor and the track determined on basis of the sensing data collected by the touch sensor both are a circle, and the two tracks are substantially the same, then it can be determined that the two tracks match.

The first sensor is a motion sensor, and the second sensor is a motion sensor.

Assuming that the first electronic device is a mobile phone with a motion sensor, the second electronic device is a mobile phone with a motion sensor, in this case, the user holds the two electronic devices with one hand, then the user hand moves, the two electronic devices are driven to move simultaneously, at this time, the tracks determined on basis of the sensing data collected by the two motion sensor are completely the same, then it can be determined that the two tracks match.

Of course, the above are only examples for illustration, collection of the tracks totally may be implemented by adopting other manners, which will not be listed one by one herein.

As will be appreciated that, the above electronic devices are described with the mobile phone as example, it does not mean that the embodiments of the present disclosure are limited to the mobile phone, instead they can be applied to any electronic devices having the sensor described above.

In the specific embodiments of the present disclosure, when the first track and the second track match, and a connection has already been established between the first electronic device and the second electronic device, a command can be executed for performing data transmission between the first electronic device and the second electronic device.

When a transmission channel has already been established between the first electronic device and the second electronic device, executing a command related to data transmission specifically includes:

executing a first sub-command, so as to transmit an object that waits to be transmitted to the second electronic device from the first electronic device.

In the specific embodiments of the present disclosure, when the first track and the second track match, but no transmission channel is established between the first electronic device and the second electronic device, a command can be executed to establish between the first electronic device and the second electronic device a transmission channel for performing data transmission, subsequently the user can perform data transmission directly according to the established transmission channel.

In the specific embodiments of the present disclosure, when the first track and the second track match, but no transmission channel is established between the first electronic device and the second electronic device, a command can be also executed to first establish between the first electronic device and the second electronic device a transmission channel for performing data transmission, thereafter use the established transmission channel to perform data transmission automatically.

When no transmission channel is established between the first electronic device and the second electronic device, executing a command related to data transmission specifically includes:

executing a second sub-command, so as to establish a transmission channel between the first electronic device and the second electronic device; and;

executing a third sub-command, so as to transmit an object that waits to be transmitted to the second electronic device from the first electronic device.

After there is a transmission channel, an object that waits to be transmitted needs to be determined if an object that waits to be transmitted needs to be transmitted from the first electronic device to the second electronic device, in the specific embodiments of the present disclosure, the object that waits to be transmitted may be a predetermined object, such a file in a specific folder, a file in a folder that is currently opened, or the like, and may also be an object manually selected by the user, but these manners all have the disadvantage of being not flexible, such as a file in a specific folder, the user need to copy the file into this folder in advance, so that automatic transmission can be achieved, if a file in a folder that is currently opened is selected, it is impossible to achieve automatic selection when there is a plurality of files, the manner that the user manually selects is more troublesome.

In order to improve the flexibility of transmission, in the specific embodiments of the present disclosure, when the first judgment result indicates that the first track and the second track match, before executing a command related to data transmission, the method further comprises:

determining an object that waits to be transmitted from objects stored in the first electronic device according to the first track.

By using the manner described above, the object that waits to be transmitted can be determined directly through the first track, the user operation is greatly simplified, and is more flexible, which will be illustrated as follows.

Figure 2:
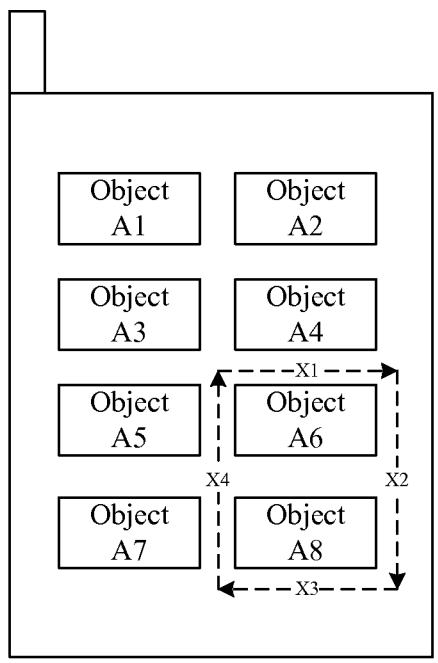
FIG. 2 shows a schematic diagram of a brief illustration of simultaneously determining the object that waits to be transmitted in the method for inter-device communication processing according to the embodiments of the present disclosure.

As shown in FIG. 2, assuming that the first electronic device is a mobile phone with a motion sensor, and the second electronic device is a mobile phone with a touch screen, wherein eight objects of A1-A8 are displayed on the current touch display screen of the second electronic device, in this case, the user holds the electronic device, thereafter the user connects one corner of the first electronic device with the touch screen of the second electronic device, then the user's hand moves, the one corner of the first electronic device is driven to move on the touch screen of the second electronic device, forming a closed track of X1-X2-X3-X4, at this time, the track determined on basis of the sensing data collected by the motion sensor and the track determined on the basis of the sensing data collected by the touch sensor both are a square, and the two tracks are substantially the same, then it can be determined the two tracks match, at the same time, it can be determined according to the closed track of X1-X2-X3-X4 that, the object that waits to be transmitted are objects A6 and A8 from the eight objects A1-A8 stored by the first electronic device.

By the manner described above, the user achieves forming the track and selecting the object that waits to be transmitted simultaneously, the user' operation is greatly simplified, and the user can flexibly adjust the track according to his/her own needs, which achieves the flexible selection of the object that waits to be selected, thereby flexibility is improved.

In the apparatus and method for inter-device communication processing in the embodiments of the present disclosure, the tracks of two parties are detected according to the acquired sensing data, and processing of a subsequent command is determined according to whether the tracks match.

However, a possibility of false triggering exits in the manner described above, illustration is made below with the first sensor being a motion sensor and the second sensor being a touch sensor as example.

Assuming that the first electronic device is a mobile phone with a motion sensor, and the second electronic device is a mobile phone with a touch screen, in this case, the user holds the first electronic device, then the user contacts one corner of the first electronic device with the touch screen of the second electronic, then the user's hand moves, the one corner of the first the first electronic device is driven to move in manner of drawing a circle on the touch screen of the second electronic device, at this time, the track determined by the sensing data collected by the motor sensor and the track determined by the sensing data collected by the touch sensor both are a circle, and the two tracks are substantially the same, then it can be determined that the two tracks match.

However, if within a certain office, a user holds one mobile phone to rotate on the table, and in another office, another user's finger rotates on the touch screen of another mobile phone, the track of motion of the former mobile phone and the track of motion of the another user's finger just match, a connection between the two mobile phones will be established and/or data is transmitted between the two mobile phones according to the above described manner, and actually the two do not want to establish a connection and/or transmit data therein between.

In order to avoid the appearance of the above-mentioned situation, the method for inter-device communication processing in the embodiments of the present disclosure further comprises:

acquiring an electronic device matching parameter;

determining whether the first electronic device and the second electronic device match according to the electronic device matching parameter, and obtaining a second judgment result;

wherein executing a command related to data transmission is implemented only when the first judgment result indicates that the first track and the second track match, and the first electronic device and the second electronic device match.

In the specific embodiments of the present disclosure, judging whether the two match can be achieved in various modes, which are specifically described as follows.

<First Mode>

Corresponding wireless receiver and wireless transmitter are set on the first electronic device and the second electronic device, in this case, the matching parameter is setting whether the wireless receiver receives a wireless signal transmitted by the wireless transmitter.

As in the example as described above, since the two mobile moves are far apart, the wireless receiver cannot receive the wireless signals transmitted by the wireless transmitter, then the matching is unsuccessful.

<Second Mode>

A software button or hardware button is set on the first electronic device and the second electronic device, only when the button is triggered, it means that the two desire to establish a connection and/or transmit data therein between, in this case, the matching parameter is a judgment result of whether the button is triggered.

<Third Mode>

Taking into account that almost all the conventional mobile phones support the search of the wireless access point, so that matching can be made according to the sequencing of the signal strength of the access points searched out by the two. In this case, the matching parameter is a searched access point.

If two mobile phones are close, and the access points that the two can search should be substantially the same, or a difference value of the signal strength of the same access point should be within a threshold, when the above conditions are not met, then it means that the two do not match.

Improper establishment of a connection/data transmission between electronic devices can be prohibited from happening through the various modes described above, the security of information is improved.

In the embodiments of the present application, the method described above may be implemented through one server, or may also be implemented through one of the electronic devices, which will be respectively described below.

<Being Implemented by a Server>

When being implemented by a server, the server will first acquire the first sensing data and the second sensor data from the first electronic device and the second electronic device, determine the first track on basis of the first sensing data and determine the second track on basis of the second sensing data; thereafter judge whether the first track and the second track match, and acquire the first judgment result;

When the first judgment result indicates that the first track and the second track match, the server will perform a command related to data transmission, obtain data from the first electronic device/the second electronic device, and transmit it to the second electronic device/the first electronic device.

<Server Exists, but being Implemented by the First Electronic Device>

When being implemented by the first electronic device, the first electronic device will acquire the second sensing data from the second electronic device through the server, the first electronic device determines the first track on basis of the first sensing data of its own sensor, and determines the second track on basis of the second sensing data; and thereafter it judges whether the first track and the second track match, and acquires the first judgment result;

When the first judgment result indicates that the first track and the second track match, the first electronic device will execute a command related to data transmission, Establishing a transmission channel used for data transmission between the first electronic device and the second electronic device directly; or Establishing a transmission channel used for data transmission between the first electronic device and the second electronic device directly, and transmitting an object that waits to be transmitted to the second electronic device; or Transmitting an object that waits to be transmitted to the server, which transmits the object that waits to be transmitted to the second electronic device.

<No Server Exists, being Implemented by the First Electronic Device>

No server exists applies to the case that a connection has already been established between the first electronic device and the second electronic device, in this case, the first electronic device directly acquires the second sensing data from the second electronic device, the first electronic device determines the first track on basis of the first sensing data of its own sensor, and determines the second track on basis of the second sensing data; and thereafter it judges whether the first track and the second track match, and acquires a first judgment result;

When the first judgment result indicates that the first track and the second track match, the first electronic device will directly transmit an object that waits to be transmitted to the second electronic device through the already-established connection.

Figure 3:
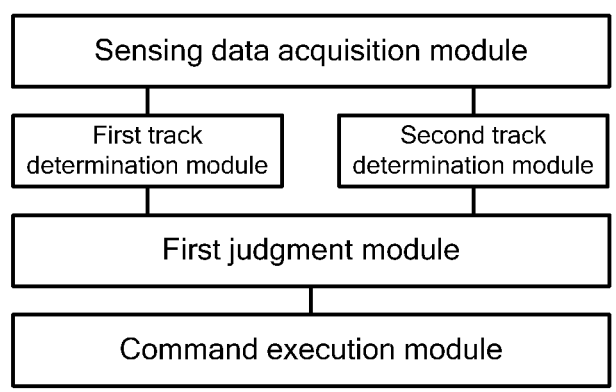
FIG. 3 shows a flowchart schematic diagram of the apparatus for inter-device communication processing according to the embodiments of the present disclosure.

The apparatus for inter-device communication processing in the embodiments of the present disclosure is shown in FIG. 3, and comprises:

a sensing data acquisition module for acquiring first sensing data collected by a first sensor arranged at a first electronic device and second sensing data collected by a second sensor arranged at a second electronic device;

a first track determination module for determining a first track on the basis of the first sensing data;

a second track determination module for determining a second track on the basis of the second sensing data;

a first judgment module for judging if the first track and the second track match, and obtaining a first judgment result; and a command execution module for, when the first judgment result indicates that the first track and the second track match, executing a command related to data transmission to establish between the first electronic device and the second electronic device a transmission channel used for data transmission and/or perform data transmission between the first electronic device and the second electronic device.

In the apparatus for inter-device communication processing described above, wherein when a transmission channel has already been established between the first electronic device and the second electronic device, the command execution module specifically includes:

a first execution unit for executing a first sub-command, so as to transmit an object that waits to be transmitted to the second electronic device from the first electronic device.

In the apparatus for inter-device communication processing described above, wherein when no transmission channel is established between the first electronic device and the second electronic device, the command execution module specifically includes:

a second execution unit for executing a second sub-command, so as to establish a transmission channel between the first electronic device and the second electronic device; and a third execution unit for executing a third sub-command, so as to transmit an object that waits to be transmitted to the second electronic device from the first electronic device.

The apparatus for inter-device communication processing described above further comprises:

an object determination unit for determining an object that waits to be transmitted from objects stored in the first electronic device according to the first track.

The apparatus for inter-device communication processing described above further comprises:

a matching parameter acquisition module for acquiring an electronic device matching parameter; and a second judgment module for determining whether the first electronic device and the second electronic device match according to the electronic device matching parameter, and obtaining a second judgment result, wherein the command execution module executes a command related to data transmission only when the first judgment result indicates that the first track and the second track match, and the second judgment result indicates that the first electronic device and the second electronic device match.

In the apparatus for inter-device communication processing described above, wherein the first sensor is a touch sensor or a motion sensor, and the second sensor is a touch sensor or a motion sensor.

In the embodiments of the present disclosure, modules may be implemented in software so as to be executed by various processors. For example, an identified executable code module may comprise one or more physical or logical blocks of a computer command, such as it may be constructed as an object, a procedure, or a function. Nevertheless, it is not necessary to locate the executable codes of the identified module together physically, instead various commands stored in different bits may be comprised, when these commands are combined logically, they constitute a module and implement prescribed purposes of the module.

In fact, the executable code module may be a single command or multiple commands, and may be even distributed on a plurality of different code segments, distributed among different programs, and disturbed across a plurality of memory devices. Likewise, operation data may be identified within the module, and may be implemented in accordance with any proper form and organized within any data structure of proper types. The operation data may be collected as a single data set, or may be distributed at different positions (including being stored in different types of storage device), and may at least partially exist in a system or a network as an electronic signal.

When the module may be implemented using software, taking into account the level of the conventional hardware technology, thus, for the module that may be implemented with software, in the case of not considering the cost, those skilled in the art can build a corresponding hardware circuit to achieve a corresponding function, the hardware circuit comprises a conventional ultra-large-scale integration (VLSI) circuit or a gate array, such as logic chips, transistors and so on among the other conventional semiconductors or other discrete components. Modules may also be implemented by using programmable hardware devices, such as field programmable gate arrays, programmable array logics, programmable logic devices, etc.

The foregoing are only preferred embodiments of the present disclosure, and are not intended to limit the present disclosure, any modifications, equivalent replacements, improvements and so on made within the spirits and principles of the present disclosure shall be included within the protection scope of the present disclosure.

The invention claimed is:

1. A method for inter-device communication processing, comprising:
    acquiring first sensing data collected by a first sensor arranged at a first electronic device and second sensing data collected by a second sensor arranged at a second electronic device;
    determining a first movement track on the basis of the first sensing data, the first movement track being used to select one or more objects to be transmitted from objects stored in the first electronic device;
    determining a second movement track on the basis of the second sensing data;
    judging if the first movement track and the second movement track match, and obtaining a first judgment result; and
    when the first judgment result indicates that the first movement track and the second movement track match, executing a command related to data transmission to establish between the first electronic device and the second electronic device a transmission channel used for data transmission and/or perform data transmission between the first electronic device and the second electronic device.

2. The method for inter-device communication processing according to claim 1, wherein when a transmission channel has already been established between the first electronic device and the second electronic device, said executing a command related to data transmission comprises:
    executing a first sub-command, so as to transmit an object that waits to be transmitted to the second electronic device from the first electronic device.

3. The method for inter-device communication processing according to claim 1, wherein when no transmission channel is established between the first electronic device and the second electronic device, said executing a command related to data transmission comprises:
    executing a second sub-command, so as to establish a transmission channel between the first electronic device and the second electronic device; and
    executing a third sub-command, so as to transmit an object that waits to be transmitted to the second electronic device from the first electronic device.

4. The method for inter-device communication processing according to claim 2, wherein when the first judgment result indicates that the first movement track and the second movement track match, before executing a command related to data transmission, the method further comprises:
    determining an object that waits to be transmitted from objects stored in the first electronic device according to the first track.

5. The method for inter-device communication processing according to claim 1, wherein the method further comprises:
    acquiring an electronic device matching parameter;
    determining whether the first electronic device and the second electronic device match according to the electronic device matching parameter, and obtaining a second judgment result,
    wherein said executing a command related to data transmission is implemented only when the first judgment result indicates that the first movement track and the second movement track match, and the first electronic device and the second electronic device match.

6. The method for inter-device communication processing according to claim 1, wherein the first sensor is a touch sensor or a motion sensor, and the second sensor is a touch sensor or a motion sensor.

7. An electronic device, comprising:
    a first sensor;
    a processor;
    a memory; and,
    computer coded instructions embodied in the memory and executable by the processor, wherein the computer coded instructions are configured to implement a method of inter-device communication processing, the method comprising:
    acquiring first sensing data collected by the first sensor and second sensing data collected by a second sensor arranged at a second electronic device;
    determining a first movement track on the basis of the first sensing data, the first movement track being used to select one or more objects to be transmitted from objects stored in the electronic device;
    determining a second movement track on the basis of the second sensing data;
    judging if the first movement track and the second movement track match, and obtaining a first judgment result; and
    when the first judgment result indicates that the first movement track and the second movement track match, executing a command related to data transmission to establish between the electronic device and the second electronic device a transmission channel.

8. The apparatus according to claim 7, wherein when a transmission channel has already been established between the electronic device and the second electronic device, the method further comprises:
    executing a first sub-command, so as to transmit an object that waits to be transmitted to the second electronic device from the electronic device.

9. The apparatus according to claim 7, wherein the inter-device communication processing apparatus, wherein, when no transmission channel is established between the electronic device and the second electronic device, the method further comprises:
    executing a second sub-command, so as to establish a transmission channel between the electronic device and the second electronic device; and
    executing a third sub-command, so as to transmit an object that waits to be transmitted to the second electronic device from the first electronic device.

10. The apparatus according to claim 8, the method further comprising: determining an object that waits to be transmitted from objects stored in the electronic device according to the first movement track.

11. The apparatus according to claim 7, the method further comprising:
    acquiring an electronic device matching parameter; and determining whether the electronic device and the second electronic device match according to the electronic device matching parameter, and obtaining a second judgment result, wherein executing a command related to data transmission only when the first judgment result indicates that the first movement track and the second movement track match, and the second judgment result indicates that the electronic device and the second electronic device match.

12. The apparatus according to claim 7, wherein the first sensor is a touch sensor or a motion sensor, and the second sensor is a touch sensor or a motion sensor.

* * * * *